United States Patent
Lin et al.

(10) Patent No.: US 12,193,056 B2
(45) Date of Patent: Jan. 7, 2025

(54) METHODS FOR PDCCH MONITORING, USER EQUIPMENT, AND BASE STATION

(71) Applicant: GUANGDONG OPPO MOBILE TELECOMMUNICATIONS CORP., LTD., Guangdong (CN)

(72) Inventors: Hao Lin, Neuilly-sur-seine (FR); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 407 days.

(21) Appl. No.: 17/736,994

(22) Filed: May 4, 2022

(65) Prior Publication Data

US 2022/0264649 A1 Aug. 18, 2022

Related U.S. Application Data

(63) Continuation of application No. PCT/CN2020/130675, filed on Nov. 20, 2020.
(Continued)

(51) Int. Cl.
*H04W 74/0816* (2024.01)
*H04W 24/08* (2009.01)
(Continued)

(52) U.S. Cl.
CPC ....... *H04W 74/0816* (2013.01); *H04W 24/08* (2013.01); *H04W 72/0446* (2013.01); *H04W 74/006* (2013.01); *H04W 74/0866* (2013.01)

(58) Field of Classification Search
CPC ............. H04W 74/0816; H04W 24/08; H04W 72/0446; H04W 74/006; H04W 74/0866
See application file for complete search history.

(56) References Cited

U.S. PATENT DOCUMENTS

2021/0022157 A1* 1/2021 Sun ................. H04W 72/23
2022/0264580 A1* 8/2022 Li ..................... H04W 72/0446
(Continued)

FOREIGN PATENT DOCUMENTS

CN 108419296 8/2018
CN 110121211 8/2019
(Continued)

OTHER PUBLICATIONS

Caict, "Discussions on DL signals and channels design in NR-U", 3GPP TSG RAN WG1 #99 R1-1913027, Nov. 2019, pp. 1-4.
Qualcomm Incorporated, " DL signals and channels for NR-U", 3GPP TSG RAN WG1 Meeting #98bis R1-1912936, Nov. 2019, pp. 1-16.
Panasonic, "DL signals and channels for NR-U", 3GPP TSG-RAN WG1 #99 R1-1913098, Nov. 2019, pp. 1-11.
Vivo, "Discussion on physical DL channel design in unlicensed spectrum", 3GPP TSG RAN WG1 #99 R1-1912010, Nov. 2019, pp. 1-10.
(Continued)

*Primary Examiner* — Deepa Belur
(74) *Attorney, Agent, or Firm* — JCIP GLOBAL INC.

(57) ABSTRACT

A method, a User Equipment, a computer program and a computer readable medium for Physical Downlink Control Channel (PDCCH) monitoring are provided. The embodiments of the disclosure provide a method for Physical Downlink Control CHannel (PDCCH) monitoring, performed by User Equipment (UE). The method includes: a first switching step, including: switching from monitoring a PDCCH of a serving cell according to a second Search Space Set (SSS) group to monitoring the PDCCH according to a first SSS group, under a first condition based on a time threshold and/or based on a Channel Occupancy Time (COT) duration occupied by a base station of a serving cell.

22 Claims, 3 Drawing Sheets

Related U.S. Application Data

(60) Provisional application No. 62/938,930, filed on Nov. 21, 2019.

(51) Int. Cl.
  *H04W 72/0446* (2023.01)
  *H04W 74/00* (2009.01)
  *H04W 74/08* (2009.01)

(56) References Cited

U.S. PATENT DOCUMENTS

| | | | |
|---|---|---|---|
| 2024/0107455 A1* | 3/2024 | Xu | H04W 52/0216 |
| 2024/0267932 A1* | 8/2024 | Rudolf | H04W 72/232 |
| 2024/0365241 A1* | 10/2024 | Zhou | H04W 72/231 |

FOREIGN PATENT DOCUMENTS

| | | | |
|---|---|---|---|
| CN | 110351874 | 10/2019 | |
| CN | 110475317 | 11/2019 | |
| TW | 201907740 | 2/2019 | |
| WO | 2019099880 | 5/2019 | |
| WO | 2019212890 | 11/2019 | |
| WO | WO-2021089857 A1 * | 5/2021 | H04L 5/0053 |

OTHER PUBLICATIONS

Ericsson, "DL signals and channels for NR-U", 3GPP TSG-RAN WG1 Meeting #98bis R1-1912707, Nov. 2019, pp. 1-25.

Oppo, "UE Adaptation to the Traffic and UE Power Consumption Characteristics", 3GPP TSG RAN WG1 Meeting #95 R1-1812824, Nov. 2018, pp. 1-10.

"Search Report of Europe Counterpart Application No. 20889771.0", issued on Nov. 2, 2022, pp. 1-17.

"Office Action of Europe Counterpart Application, Application No. 20889771.0", issued on Oct. 27, 2023, p. 1-p. 9.

"Notice of Allowance of China Counterpart Application, Application No. 202210832820.1", with English translation thereof, issued on Nov. 22, 2023, p. 1-p. 6.

"Office Action of China Counterpart Application, Application No. 202210832820.1", with English translation thereof, Issued on Jun. 14, 2023, p. 1-p. 21.

"Office Action of Europe Counterpart Application, Application No. 20889771.0", issued on Jul. 11, 2023, p. 1-p. 4.

"International Search Report (Form PCT/ISA/210) of PCT/CN2020/130675," mailed on Jan. 22, 2021, pp. 1-2.

"Written Opinion of the International Searching Authority (Form PCT/ISA/237) of PCT/CN2020/130675," mailed on Jan. 22, 2021, pp. 1-5.

* cited by examiner

METHODS FOR PDCCH MONITORING, USER EQUIPMENT, AND BASE STATION

CROSS-REFERENCE TO RELATED APPLICATION

This application is a continuation of international application of PCT application serial no. PCT/CN2020/130675 filed on Nov. 20, 2020, which claims the priority benefit of U.S. provisional application No. 62/938,930, filed on Nov. 21, 2019. The entirety of each of the above mentioned patent applications is hereby incorporated by reference herein and made a part of this specification.

TECHNICAL FIELD

The present disclosure relates to communication technology, in particular to Physical Downlink Control CHannel (PDCCH) monitoring.

BACKGROUND

The statements in this section merely provide information related to the present disclosure and may not constitute prior art. Further, the content in this section may be used to define a concept related to the invention.

Unlicensed spectrum is a shared spectrum. Multiple communication equipment in different communication systems can use the unlicensed spectrum as long as they meet the regulatory requirements set by the country or region on the unlicensed spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, a communication device shall follow the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a device successfully occupies the channel, the transmission duration cannot exceed the Maximum Channel Occupancy Time (MCOT).

SUMMARY

Methods, User Equipment, base station, computer programs and a computer readable media for PDCCH monitoring are provided.

The embodiments of the disclosure provide a method for Physical Downlink Control CHannel (PDCCH) monitoring, performed by User Equipment (UE). The method includes: a first switching step, including: switching from monitoring a PDCCH of a serving cell according to a second Search Space Set (SSS) group to monitoring the PDCCH according to a first SSS group, under a first condition based on a time threshold and/or based on a Channel Occupancy Time (COT) duration occupied by a base station of a serving cell.

The embodiments of the disclosure provide a method for Physical Downlink Control CHannel (PDCCH) monitoring, performed by a base station. The method includes: providing User Equipment (UE) with a time threshold and/or a Channel Occupancy Time (COT) duration occupied by the base station, wherein the time threshold is determined from a threshold set.

The embodiments of the disclosure provide a computer readable medium, comprising instructions, when executed by User Equipment (UE), causing the UE to perform the method in the above.

The embodiments of the disclosure provide a base station, configured to perform the method in the above.

BRIEF DESCRIPTION OF THE DRAWINGS

The drawings are used merely for illustration purposes but not for limiting the invention.

DETAILED DESCRIPTION

Figure 1:
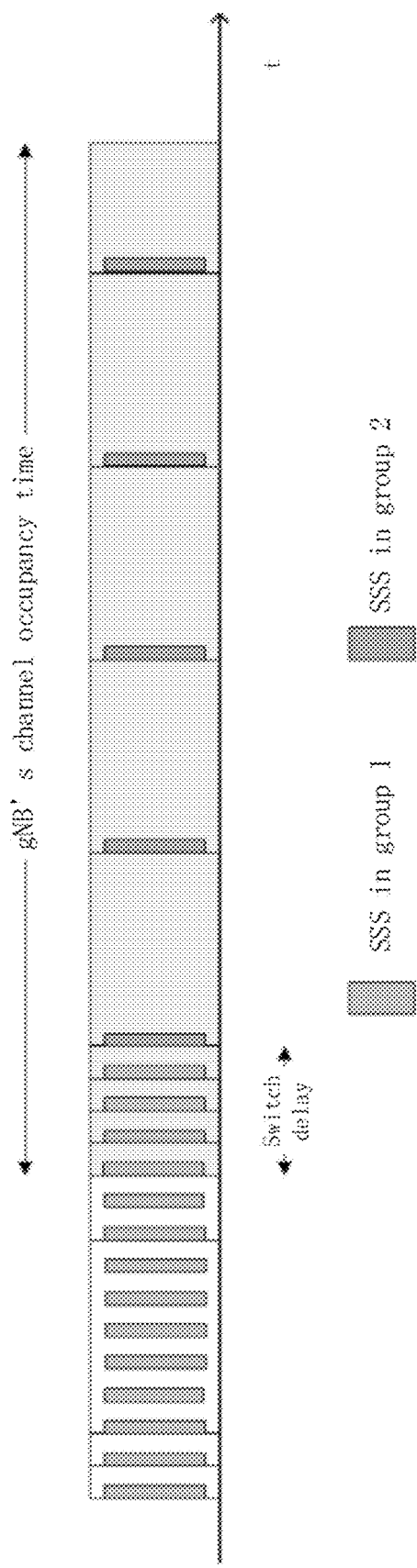
FIG. 1 shows an example of SSS group switching.

In a New Radio-Unlicensed spectrum (NR-U) system, a UE can be provided with two groups of Search Space Sets (SSS) for PDCCH monitoring. The UE may switch PDCCH monitoring from group 1 to group 2 or from group 2 to group 1 during different monitoring phases. SSS group 1 may be called as search space sets with group index 0, and SSS group 2 may be called as search space sets with group index 1. Further, SSS group 1 may be called as a first SSS group, and SSS group 2 may be called as a second SSS group. For example, as shown in FIG. 1, a UE may monitor PDCCH in search space sets in group 1 outside a gNB's channel occupancy (CO) and may switch to monitor PDCCH in search space sets in group 2 when the UE finds that the gNB acquires the channel occupancy. Note that there could be a switch delay for PDCCH monitoring switching, e.g., from group 1 to group 2 and/or from group 2 to group 1.

Figure 2:
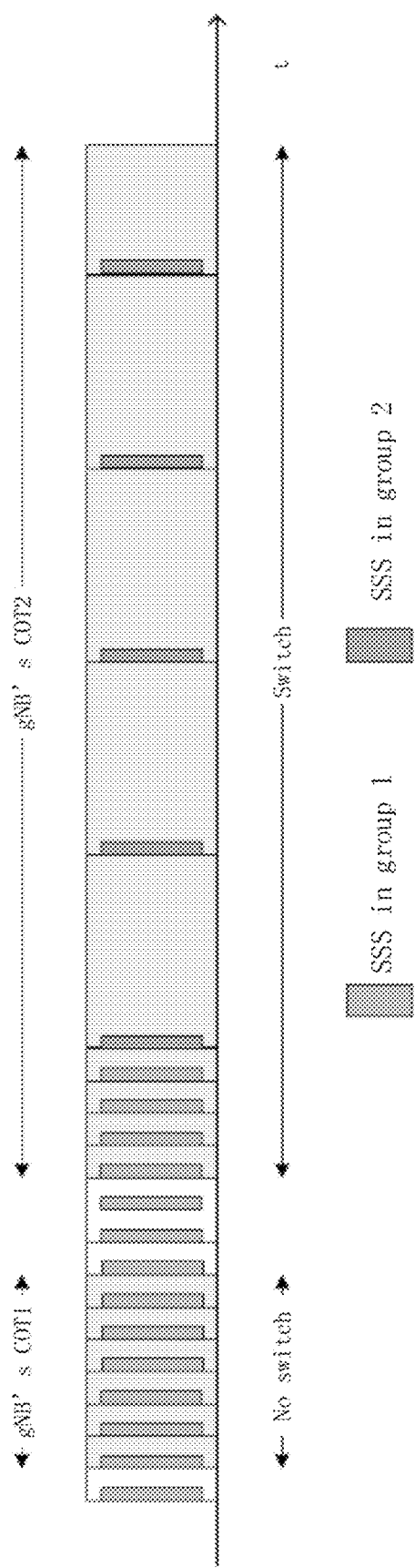
FIG. 2 shows another example of SSS group switching.

In some cases, a gNB may not want a UE to switch groups even the gNB acquires a channel occupancy in an unlicensed carrier, for example, the gNB only intends to have a short CO or the gNB intends to start another CO soon after. As shown in FIG. 2 as an example, the gNB may start a short CO, e.g., COT 1 to transmit high priority signal(s)/channel(s), e.g., a Synchronization Signal Block (SSB), and during this COT1, the gNB does not want the UE to switch PDCCH monitoring group. After that, the gNB may plan to have a longer CO, e.g., COT 2 and may want the UE to switch PDCCH monitoring group.

The present disclosure addresses the conditions when the UE can switch from PDCCH monitoring in search space sets in group 1 to PDCCH monitoring in search space sets in group 2, and/or the conditions when the UE can switch from PDCCH monitoring in search space sets in group 2 to PDCCH monitoring in search space sets in group 1.

The following solutions is provided.

Step 1: UE may determine a threshold and/or a COT duration;

Step 2: UE may switch PDCCH monitoring groups based on the threshold and/or the COT duration.

Optionally, all the optional solutions in the present disclosure can be (Radio Resource Control (RRC) configured if they are not mutual exclusion. In particular, all the parameters such as the threshold and the COT duration may be RRC configured. In such a case, the UE may determine the threshold and/or the COT duration means that the UE may receive information about the threshold and/or the COT duration through an RRC message from a base station, e.g., an eNB or a gNB, so that the UE can determine the threshold and/or the COT duration based on the received RRC message.

Optionally, the step of UE determining the threshold may include at least one of the followings:

The threshold may be predefined, e.g., specified in the specification.

The threshold may be RRC configured, or the threshold may be determined according to a configured RRC parameter, for example, a parameter searchSpaceSwitchTimer in an RRC information element PDCCH-ServingCellConfig.

The threshold may be indicated through Downlink Control Information (DCI), or the threshold may be determined according to a parameter in DCI.

The threshold may be indicated through a Media Access Control Control Element (MAC CE), or the threshold may be determined according to a parameter in a MAC CE.

The threshold may be determined from a threshold set.

Optionally, the threshold set could be a configured/predefined threshold table.

Optionally, different threshold values in the threshold set can be used for different cases.

Optionally, different threshold values in the threshold set can be used for different subcarrier spacings.

When the threshold is RRC configured or determined according to a configured RRC parameter, the base station may determine the threshold from a threshold set and then send information about the determined threshold through an RRC message to the UE, e.g., through a parameter searchSpaceSwitchTimer in an RRC information element PDCCH-ServingCellConfig. In this case, the threshold set may include different threshold values for different subcarrier spacings.

Optionally, the threshold may be determined in the unit of at least one of: symbol, slot, subframe, frame, microsecond, millisecond, second. That is, the threshold is a time threshold with a value in time, e.g., as a timer value for a timer.

Optionally, UE may determine the COT duration according to a DCI format 2_0.

Optionally, UE may determine the COT duration according to a COT duration indication and/or an SFI indication.

E.g., the COT duration indication and/or the SFI indication can be transmitted in DCI format 2_0.

Optionally, the COT duration could be the remaining COT duration or the total COT duration.

Optionally, UE may switch PDCCH monitoring groups based on the threshold and the COT duration, includes:

If UE determines that the COT duration is longer than or equal to the threshold, the UE may switch PDCCH monitoring groups, and/or, If UE determines the COT duration is shorter than or equal to the threshold, the UE may not switch PDCCH monitoring groups.

Optionally, UE may switch PDCCH monitoring groups based on the threshold and/or the COT duration, includes:

A COT end position is determined based on the COT duration, and the UE may switch PDCCH monitoring groups based on the threshold and the COT end position. Optionally, The UE may not switch PDCCH monitoring groups within the time duration which equals to the threshold after the COT end position, and/or, The UE may switch PDCCH monitoring groups outside the time duration which equals to the threshold after the COT end position.

Optionally, PDCCH monitoring group switching from group 1 to group 2 and from group 2 to group 1 may fulfill different conditions.

Optionally, UE may be provided a switch delay for PDCCH monitoring switching, e.g., from group 1 to group 2 and/or from group 2 to group 1.

E.g., the switch delay could be a slot boundary or next available slot boundary that is at least N symbols later than a starting position. That is, a PDCCH monitoring switching may be delayed to the slot boundary or the next available slot boundary that is at least N symbols later than the starting position.

E.g., the starting position could be the last symbol of a detected DCI format, i.e., the last symbol of the PDCCH with the DCI format.

E.g., the starting position could be the last symbol of a detected DCI with specified DCI format, i.e., the last symbol of the PDCCH with the specified DCI format.

The specified DCI format could be DCI format 2_0, or a UE-specific DCI format, or a common DCI format.

The specified DCI format could be DCI format in a specified group, e.g., group 1.

E.g., the starting position may be a slot where a timer that has been set with the time threshold expires.

Optionally, UE may switch PDCCH monitoring groups based on the threshold and the COT duration, includes at least one of the following:

The UE may switch from group 1 to group 2 when after detection of any PDCCH in group1 at a slot boundary (or next available slot boundary) that is at least N symbols later than the last symbol of the detected PDCCH in group 1, if the COT duration is longer than or equal to the threshold.

The UE may not switch from group 1 to group 2 when after detection of any PDCCH in group1 at a slot boundary (or next available slot boundary) that is at least N symbols later than the last symbol of the detected PDCCH in group 1, if the COT duration is shorter than or equal to the threshold.

The UE may switch from group 1 to group 2 when after detection of any DCI format 2_0 in group1 at a slot boundary (or next available slot boundary) that is at least N symbols later than the last symbol of the detected PDCCH in group 1, if the COT duration is longer than or equal to the threshold.

The UE may not switch from group 1 to group 2 when after detection of any DCI format 2_0 in group1 at a slot boundary (or next available slot boundary) that is at least N symbols later than the last symbol of the detected PDCCH in group 1, if the COT duration is shorter than or equal to the threshold.

Optionally, UE may switch PDCCH monitoring groups under other conditions. E.g., UE may switch PDCCH monitoring groups under at least one of the followings:

UE may switch PDCCH monitoring groups based on a monitoring group flag in DCI format 2_0.

UE may switch PDCCH monitoring groups based on a detection of any PDCCH in group1, e.g., a detection of a DCI format in a PDCCH.

UE may switch PDCCH monitoring groups if no PDCCH is detected in group2 for a configurable time.

Optionally, the behavior of PDCCH monitoring group switching can be RRC configured.

Example 1: UE can be RRC configured with at least one of the following behaviors for PDCCH group switching from group 1 to group 2:

UE may switch PDCCH monitoring groups based on the threshold and/or the COT duration.

UE may switch PDCCH monitoring groups based on a monitoring group flag in DCI format 2_0.

UE may switch PDCCH monitoring groups based on a detection of any PDCCH in group 1, e.g., detection of a DCI format 2_0 in a PDCCH.

Optionally, a UE may, e.g. after switching from group 1 to group 2, set the value of a timer as the threshold, and then decrement the value of the timer by one after each time unit, e.g., a time unit of symbol, slot, subframe, frame, microsecond, millisecond, or second.

Example 2: UE can be RRC configured with at least one of the following behaviors for PDCCH group switching from group 2 to group 1:

UE may switch PDCCH monitoring groups based on the threshold and/or the COT end position. For example, UE may switch PDCCH monitoring groups when the timer set with the threshold expires. For example, UE may switch PDCCH monitoring groups after the end of the COT duration, i.e., after the COT end position.

UE may switch PDCCH monitoring groups if no PDCCH is detected in group2 for a configurable time.

In summary, it is provided a method of PDCCH monitoring in NR-U. With this method, a UE can determine when to switch PDCCH monitoring groups without extra signaling overhead, and avoid frequently switching PDCCH monitoring groups especially when a gNB does not want the UE to switch PDCCH monitoring group. Implementation complexity at UE side can be reduced.

The technical mechanisms provided by the present disclosure could be adopted in the 5G NR unlicensed band communications.

In addition, it is provided UE that is configured to perform one of the above methods.

Figure 3:
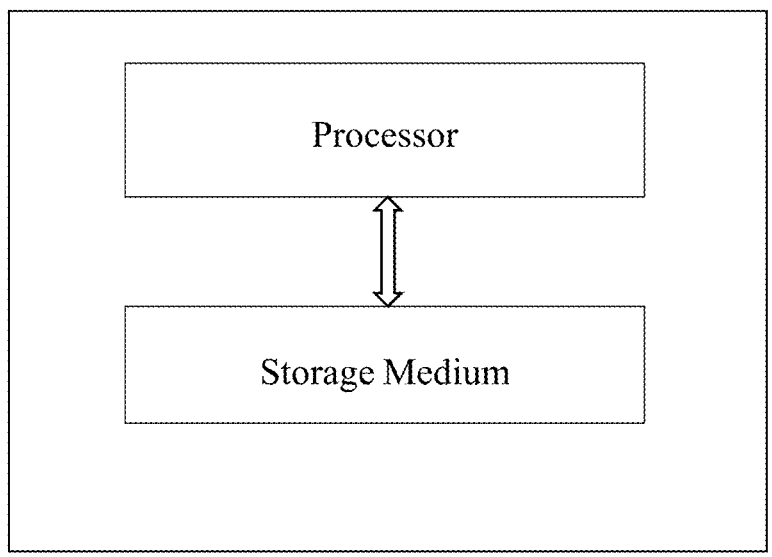
FIG. 3 shows an exemplary UE.

The UE may comprises one or more storage medium storing computer readable instructions, and one or more computing processors configured to execute the computer readable instructions for performing one of the above methods, for example as shown in FIG. 3.

The UE may comprise a plurality of modules, each module is configured to perform one or more of method steps to complete one of above methods.

It is provided a computer program, comprising instructions, when executed by user equipment, for causing the user equipment to perform one of the above methods.

It is provided a computer readable medium, comprising instructions for causing a user equipment to perform one of the above methods.

It is also provided a base station that is configured for RRC configuration, e.g., transmitting information about the threshold and/or COT duration to the UE.

CLAUSES

1. A method for Physical Downlink Control Channel (PDCCH) monitoring, performed by User Equipment (UE), comprising:
   a first switching step, comprising: switching from monitoring a PDCCH of a serving cell according to a second Search Space Set (SSS) group to monitoring the PDCCH according to a first SSS group, under a first condition based on a time threshold and/or based on a Channel Occupancy Time (COT) duration occupied by a base station of a serving cell.

2. The method of clause 1, wherein the time threshold is a timer value in a unit of slot.

3. The method of clause 2, wherein under the first condition based on the time threshold comprises: a condition of after a timer that has been set to the timer value expires.

4. The method of any of the preceding clauses, wherein the time threshold is configured through Radio Resource Control (RRC) by the base station.

5. The method of any of the preceding clauses, wherein under the first condition based on the COT duration occupied by the base station of the serving cell comprising: a condition of after a COT end position of the COT duration.

6. The method of any of the preceding clauses, further comprising:
   a second switching step, comprising: switching from monitoring the PDCCH according to the first SSS group to monitoring the PDCCH according to the second SSS group, under a second condition based on a monitoring group flag in a detected Downlink Control information (DCI) format 2_0, and/or a detection of a PDCCH by monitoring the PDCCH according to the first SSS group.

7. The method of clause 6, wherein a switching delay is provided before the second switching step and after the second condition is fulfilled.

8. The method of any of the preceding clauses, wherein a switching delay is provided before the first switching step and after the first condition is fulfilled.

9. The method of clause 7 or 8, wherein the switch delay refers to a next available slot boundary that is at least N symbols later than a starting position, wherein N is a positive integer.

10. The method of clause 9, wherein the starting position is one of the followings:
    the last symbol of a detected PDCCH with a DCI format;
    the last symbol of a detected PDCCH with the DCI format 2_0;
    a slot where the timer that has been set to the time value expires.

11. The method of any one of clauses 7 to 10, wherein the switching delay is configured through Radio Resource Control (RRC) by the base station.

12. The method of any of the preceding clauses, wherein the COT duration is indicated in an RRC information element Slot Format Indicator (SFI).

13. The method of any of the preceding clauses, wherein information indicating the COT duration is transmitted in a Downlink Control Information (DCI) format 2_0.

14. The method of any of clauses 2 to 13, wherein the timer value is configured through Radio Resource Control (RRC) by the base station.

15. The method of clause 14, wherein the timer value is indicated by a parameter searchSpaceSwitchTimer in an RRC information element PDCCH-ServingCellConfig.

16. The method of any of the preceding clauses, wherein the first SSS group has a period being shorter than the period of the second SSS group.

17. A method for Physical Downlink Control Channel (PDCCH) monitoring, performed by a base station, comprising:
    providing User Equipment (UE) with a time threshold and/or a Channel Occupancy Time (COT) duration occupied by the base station,
    wherein the time threshold is determined from a threshold set.

18. The method of clause 17, wherein
different time thresholds in the threshold set are used for different subcarrier spacings.
19. The method of clause 17 or 18, wherein
the threshold set is a predefined threshold table.
20. The method of clause 17 or 18 or 19, wherein
the time threshold is a timer value in a unit of slot.
21. The method of any one of clauses 17 to 20, wherein
the time threshold is transmitted through a Radio Resource Control (RRC) message to the UE.
22. The method of clause 21, wherein
the time threshold is indicated by a parameter searchSpaceSwitchTimer in an RRC information element PDCCH-ServingCellConfig.
23. The method of any of clauses 17 to 22, wherein
the COT duration is indicated in an RRC information element Slot Format Indicator (SFI).
24. The method of any of clauses 17 to 23, wherein
information indicating the COT duration is transmitted in a Downlink Control Information (DCI) format 2_0.
25. The method of any of the preceding clauses, being a method of PDCCH monitoring in a New Radio-Unlicensed spectrum (NR-U) system.
26. The method of any of the preceding clauses, wherein the base station is an eNB for a Long Term Evolution (LTE) system or a gNB for 5$^{th}$ Generation (5G) system.
27. User equipment (UE), configured to perform the method of any of clauses 1 to 16, 25 and 26.
28. The user equipment of clause 27, comprising one or more storage medium storing computer readable instructions, and one or more computing processors configured to execute the computer readable instructions for performing the method of any one of clauses 1 to 16.
29. A computer program, comprising instructions, when executed by user equipment, for causing the user equipment to perform the method according to any one of clauses 1 to 16, 25 and 26.
30. A computer readable medium, comprising instructions, when executed by User Equipment (UE), causing the UE to perform the method of any one of clauses 1 to 16, 25 and 26.
31. A base station, configured to perform the method of any of clauses 17 to 26.
32. The base station of clause 31, comprising one or more storage medium storing computer readable instructions, and one or more computing processors configured to execute the computer readable instructions for performing the method of any one of clauses 17 to 26.
33. A computer program, comprising instructions, when executed by a base station, for causing the base station to perform the method according to any one of clauses 17 to 26.
34. A computer readable medium, comprising instructions, when executed by a base station, causing the base station to perform the method of any one of clauses 17 to 26.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:
1. A method for Physical Downlink Control Channel (PDCCH) monitoring, performed by User Equipment (UE), comprising:
a first switching step, comprising: switching from monitoring a PDCCH of a serving cell according to a second Search Space Set (SSS) group to monitoring the PDCCH according to a first SSS group, under a first condition based on a time threshold and/or based on a Channel Occupancy Time (COT) duration occupied by a base station of a serving cell;
being provided a switching delay before a second switching step and after a second condition is fulfilled;
the second switching step, comprising: switching from monitoring the PDCCH according to the first SSS group to monitoring the PDCCH according to the second SSS group, under the second condition based on a monitoring group flag in a detected Downlink Control information (DCI) format 2_0, and/or a detection of a PDCCH by monitoring the PDCCH according to the first SSS group.
2. The method of claim 1, wherein
the time threshold is a timer value in a unit of slot, wherein
under the first condition based on the time threshold comprises: a condition of after a timer that has been set to the timer value expires.
3. The method of claim 1, wherein
the time threshold is configured through Radio Resource Control (RRC) by the base station, wherein
under the first condition based on the COT duration occupied by the base station of the serving cell comprising: a condition of after a COT end position of the COT duration.
4. The method of claim 1, wherein
another switching delay is provided before the first switching step and after the first condition is fulfilled.
5. The method of claim 4, wherein
the another switch delay refers to a next available slot boundary that is at least N symbols later than a starting position, wherein N is a positive integer.
6. The method of claim 5, wherein the starting position is one of the followings:
the last symbol of a detected PDCCH with a DCI format;
the last symbol of a detected PDCCH with the DCI format 2_0;
a slot where the timer that has been set to the time value expires.
7. The method of claim 1, wherein
the switching delay is configured through Radio Resource Control (RRC) by the base station.
8. The method of claim 1, wherein
the COT duration is indicated in an RRC information element Slot Format Indicator (SFI).
9. The method of claim 1, wherein
information indicating the COT duration is transmitted in a Downlink Control Information (DCI) format 2_0.
10. The method of claim 2, wherein
the timer value is configured through Radio Resource Control (RRC) by the base station.
11. The method of claim 10, wherein
the timer value is indicated by a parameter searchSpaceSwitchTimer in an RRC information element PDCCH-ServingCellConfig.
12. A method for configuring Physical Downlink Control Channel (PDCCH) monitoring for User Equipment (UE), performed by a base station, comprising:
providing a switching delay and a second condition to the UE;
providing the UE with a time threshold and/or a Channel Occupancy Time (COT) duration occupied by the base station, wherein the time threshold and/or the COT duration allows the UE to perform:

a first switching step, comprising: switching from monitoring a PDCCH of a serving cell according to a second Search Space Set (SSS) group to monitoring the PDCCH according to a first SSS group, under the first condition based on the time threshold and/or based on the COT duration;

being provided the switching delay before a second switching step and after the second condition is fulfilled;

the second switching step, comprising: switching from monitoring the PDCCH according to the first SSS group to monitoring the PDCCH according to the second SSS group, under the second condition based on a monitoring group flag in the detected DCI format 2_0, and/or a detection of a PDCCH by monitoring the PDCCH according to the first SSS group, wherein the time threshold is determined from a threshold set.

13. The method of claim 12, wherein different time thresholds in the threshold set are used for different subcarrier spacings.

14. The method of claim 12, wherein the threshold set is a predefined threshold table.

15. The method of claim 12, wherein the time threshold is a timer value in a unit of slot.

16. The method of claim 12, wherein the time threshold is transmitted through a Radio Resource Control (RRC) message to the UE.

17. The method of claim 16, wherein the time threshold is indicated by a parameter searchSpaceSwitchTimer in an RRC information element PDCCH-ServingCellConfig.

18. The method of claim 12, wherein the COT duration is indicated in an RRC information element Slot Format Indicator (SFI).

19. The method of claim 12, wherein information indicating the COT duration is transmitted in a Downlink Control Information (DCI) format 2_0.

20. The method of claim 12, being a method of PDCCH monitoring in a New Radio—Unlicensed spectrum (NR-U) system.

21. User equipment (UE), configured to perform:
a first switching, comprising: switching from monitoring a PDCCH of a serving cell according to a second Search Space Set (SSS) group to monitoring the PDCCH according to a first SSS group, under a first condition based on a time threshold and/or based on a Channel Occupancy Time (COT) duration occupied by a base station of a serving cell;

being provided a switching delay before a second switching and after a second condition is fulfilled;

the second switching, comprising: switching from monitoring the PDCCH according to the first SSS group to monitoring the PDCCH according to the second SSS group, under the second condition based on a monitoring group flag in a detected Downlink Control information (DCI) format 2_0, and/or a detection of a PDCCH by monitoring the PDCCH according to the first SSS group.

22. A base station, configured to perform:
providing a switching delay and a second condition to User Equipment (UE);

providing the UE with a time threshold and/or a Channel Occupancy Time (COT) duration occupied by the base station, wherein the time threshold and/or the COT duration allows the UE to perform:

a first switching, comprising: switching from monitoring a PDCCH of a serving cell according to a second Search Space Set (SSS) group to monitoring the PDCCH according to a first SSS group, under the first condition based on the time threshold and/or based on the COT duration;

being provided the switching delay before a second switching and after the second condition is fulfilled;

the second switching, comprising: switching from monitoring the PDCCH according to the first SSS group to monitoring the PDCCH according to the second SSS group, under the second condition based on a monitoring group flag in the detected DCI format 2_0, and/or a detection of a PDCCH by monitoring the PDCCH according to the first SSS group, wherein the time threshold is determined from a threshold set.

* * * * *